US012242213B2

(12) United States Patent
Kusuda et al.

(10) Patent No.: US 12,242,213 B2
(45) Date of Patent: Mar. 4, 2025

(54) CARTRIDGE INCLUDING HOLDER THAT HOLDS ELECTRICAL CONTACT SURFACE AND HAS HOLE OVERLAPPED WITH THE SAME

(71) Applicant: BROTHER KOGYO KABUSHIKI KAISHA, Nagoya (JP)

(72) Inventors: Shinya Kusuda, Nagoya (JP); Nao Itabashi, Nagoya (JP); Masaaki Furukawa, Nagoya (JP); Shuhei Hatano, Komaki (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/162,084

(22) Filed: Jan. 31, 2023

(65) Prior Publication Data

US 2023/0244156 A1 Aug. 3, 2023

(30) Foreign Application Priority Data

Feb. 1, 2022 (JP) ................................ 2022-014343

(51) Int. Cl.
*G03G 21/18* (2006.01)
*G03G 15/08* (2006.01)

(52) U.S. Cl.
CPC ..... *G03G 15/0875* (2013.01); *G03G 15/0863* (2013.01); *G03G 21/1878* (2013.01);
(Continued)

(58) Field of Classification Search
CPC ....... G03G 15/0875; G03G 2215/0665; G03G 2215/0872; G03G 15/0863;
(Continued)

(56) References Cited

U.S. PATENT DOCUMENTS

2013/0183058 A1 7/2013 Won
2017/0269544 A1* 9/2017 Itabashi ............ G03G 21/1676
(Continued)

FOREIGN PATENT DOCUMENTS

JP 2018-109732 A 7/2018
JP 2021-162749 A 10/2021

OTHER PUBLICATIONS

International Search Report and Written Opinion issued in corresponding International Patent Application No. PCT/JP2022/002682, Mar. 14, 2023.

*Primary Examiner* — Arlene Heredia
*Assistant Examiner* — Laura Roth
(74) *Attorney, Agent, or Firm* — Merchant & Gould P.C.

(57) ABSTRACT

A cartridge includes: a housing; a storage medium including an electrical contact surface; and a storage medium holder holding the storage medium and movable relative to the housing. The storage medium holder is positioned at one end portion of the housing in a first direction and includes: a first holder holding the electrical contact surface; a second holder positioned spaced away from the first holder in a second direction crossing the first direction; and an elastic member expandable and shrinkable in the second direction between the first holder and the second holder. The first holder has a first hole penetrating the first holder in the second direction. The first hole is positioned farther from the housing in the first direction than the second holder and the elastic member are from the housing in the first direction and is overlapped with the electrical contact surface as viewed in the second direction.

25 Claims, 12 Drawing Sheets

(52) U.S. Cl.
CPC ..... *G03G 21/1885* (2013.01); *G03G 21/1853* (2013.01); *G03G 2215/0665* (2013.01); *G03G 2215/0697* (2013.01); *G03G 2215/0872* (2013.01); *G03G 2221/1823* (2013.01)

(58) Field of Classification Search
CPC ........... G03G 15/0896; G03G 21/1853; G03G 21/1867; G03G 21/1885; G03G 21/1882; G03G 21/1878; G03G 21/1892; G03G 2215/0697; G03G 2221/1823
See application file for complete search history.

(56) References Cited

U.S. PATENT DOCUMENTS

| | | | | |
|---|---|---|---|---|
| 2018/0284690 | A1* | 10/2018 | Mizutani ............ | G03G 15/0865 |
| 2021/0063961 | A1* | 3/2021 | Itabashi ............. | G03G 21/1867 |
| 2021/0311410 | A1 | 10/2021 | Kusuda et al. | |
| 2023/0244183 | A1* | 8/2023 | Mori .................. | G03G 21/1885 399/12 |

* cited by examiner

CARTRIDGE INCLUDING HOLDER THAT HOLDS ELECTRICAL CONTACT SURFACE AND HAS HOLE OVERLAPPED WITH THE SAME

REFERENCE TO RELATED APPLICATIONS

This application claims priority from Japanese Patent Application No. 2022-014343 filed on Feb. 1, 2022. The entire content of the priority application is incorporated herein by reference.

BACKGROUND ART

In recent years, a developing cartridge to be attached to an image-forming apparatus has been provided with a storage medium for storing therein various information. For example, there has conventionally been known a developing cartridge including a developing memory. The developing memory is held by a first holder that is movable relative to a housing of the developing cartridge. Hence, the developing memory is movable relative to the housing.

DESCRIPTION

However, in the conventional technology, it is not easy to detach a storage medium from a storage medium holder. For example, in the case of the developing memory described above, it is considered that the developing memory is detached using the principle of leverage by inserting a jig into a gap between the developing memory and the first holder. However, if there is not a large enough gap, the developing memory cannot be easily detached.

In view of the foregoing, it is an object of the present disclosure to provide a technology enabling a storage medium to be easily detached from a storage medium holder.

In order to attain the above and other objects, the present disclosure provides a cartridge including a housing, a storage medium, and a storage medium holder. The storage medium includes an electrical contact surface. The storage medium holder holds the storage medium. The storage medium holder is positioned at one end portion of the housing in a first direction. The storage medium holder is movable relative to the housing. The storage medium holder includes a first holder, a second holder, and an elastic member. The first holder holds the electrical contact surface. The second holder is positioned spaced away from the first holder in a second direction crossing the first direction. The elastic member is positioned between the first holder and the second holder. The elastic member is expandable and shrinkable in the second direction. The first holder has a first hole penetrating the first holder in the second direction. The first hole is positioned farther from the housing in the first direction than the second holder and the elastic member are from the housing in the first direction. The first hole is overlapped with the electrical contact surface as viewed in the second direction.

In the above configuration, since the first hole penetrating the first holder in the second direction and is overlapped with the electrical contact surface as viewed in the second direction, the storage medium attached to the storage medium holder can be easily detached by a rod-shaped detachment jig being inserted into the first hole. Also, since the first hole is positioned farther from the housing in the first direction than the second holder and the elastic member are from the housing in the first direction, the detachment jig can be inserted into the first hole without being hindered by the second holder or the elastic member.

Figure 1:
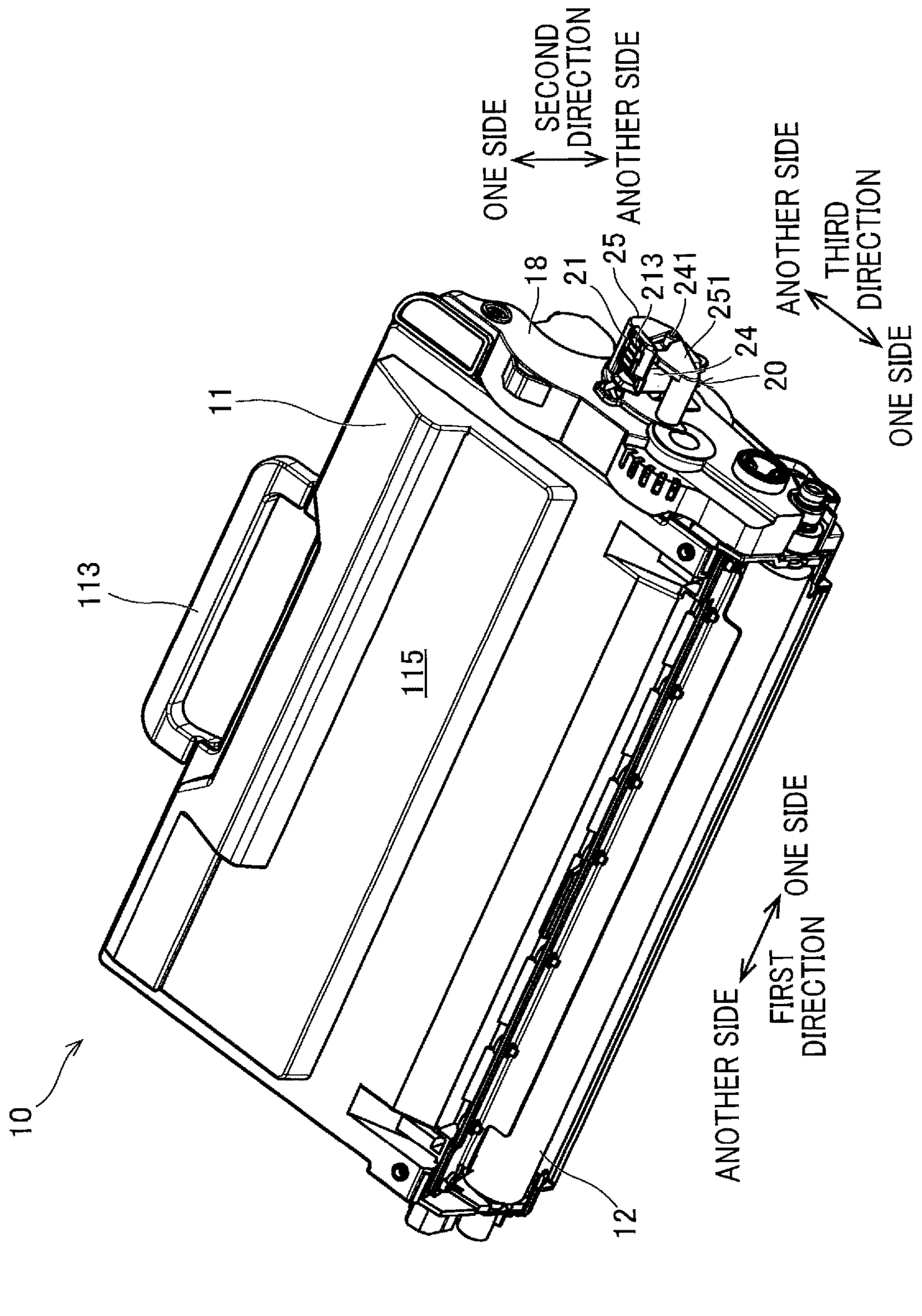
FIG. 1 is a perspective view of a developing cartridge.

Hereinafter, embodiments of the present disclosure will be described while referring to the accompanying drawings. Note that components illustrated in the drawings are mere examples and not intended to limit the scope of the present disclosure only thereto. To facilitate understanding, the dimension of each part or the number of parts may be simplified as needed basis in the drawings.

1. Embodiments

Figure 2:
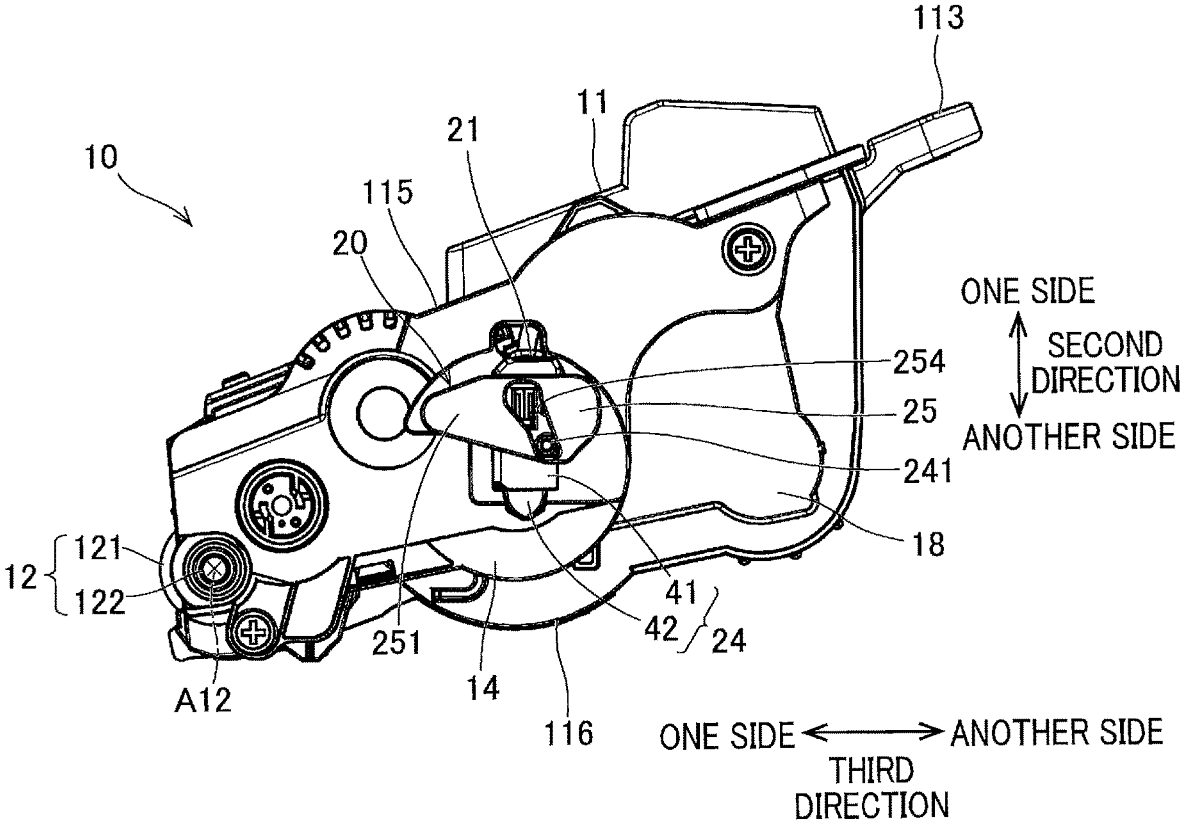
FIG. 2 is a side perspective view of the developing cartridge.
Figure 3:
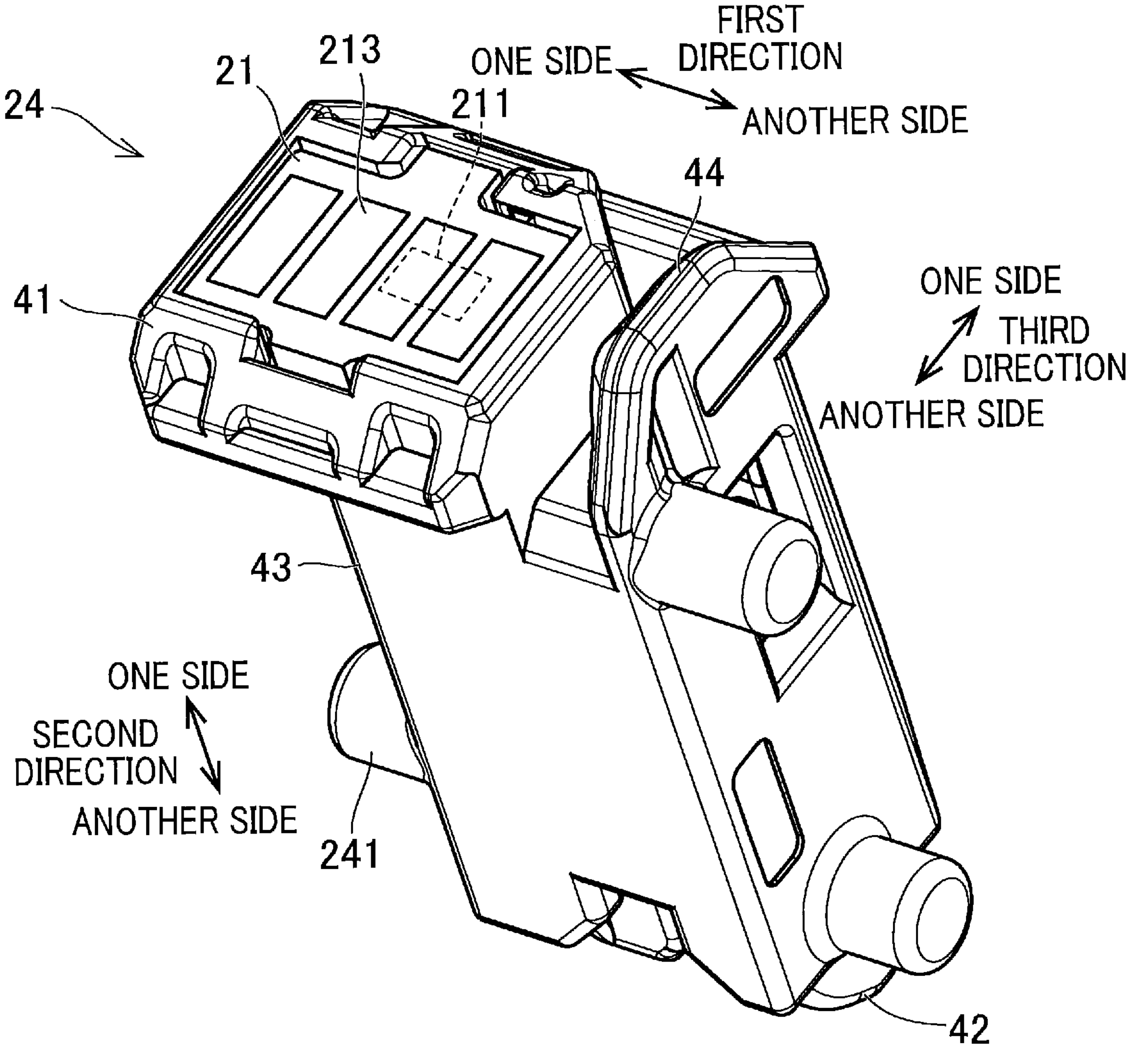
FIG. 3 is a perspective view of an IC chip holder as viewed from one side in a second direction.
Figure 4:
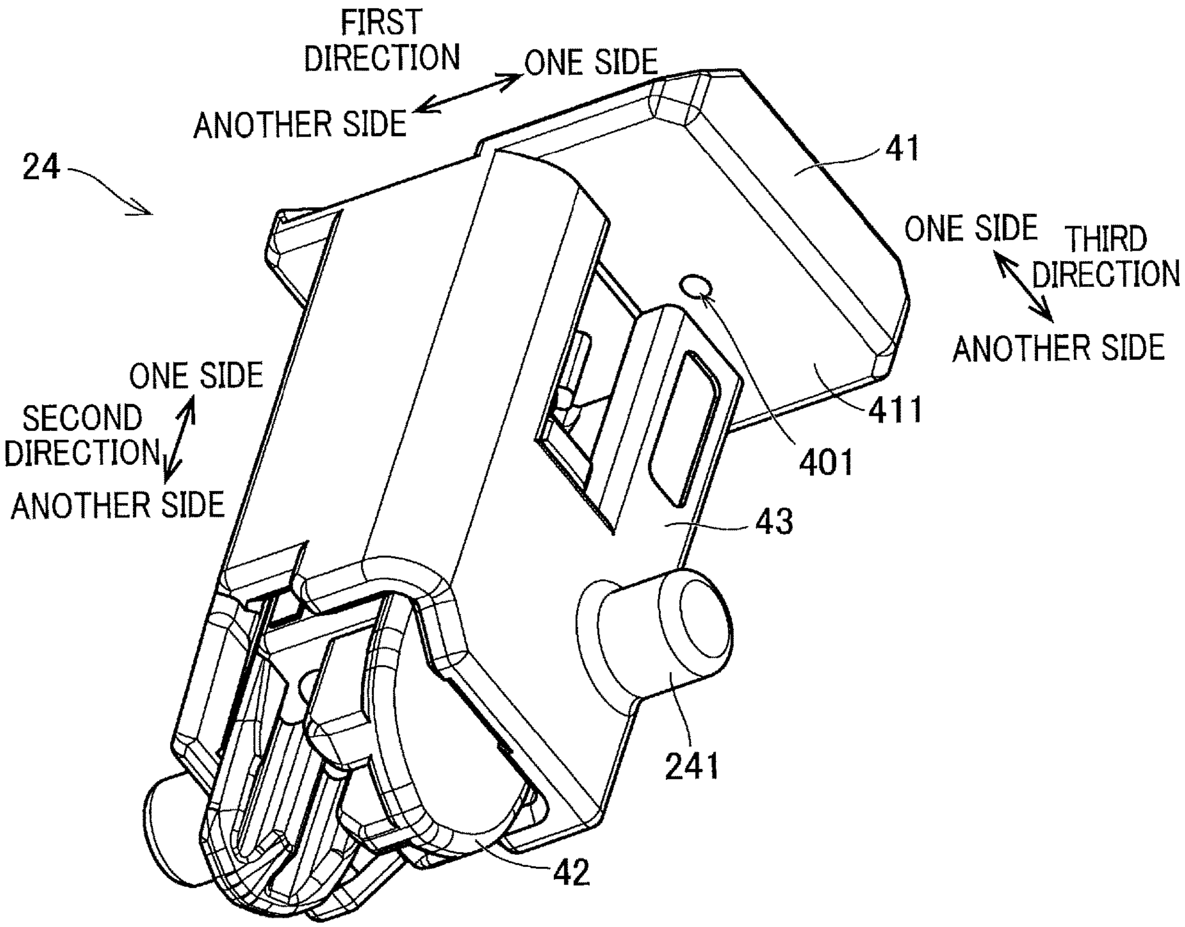
FIG. 4 is a perspective view of the IC chip holder as viewed from another side in the second direction.
Figure 5:
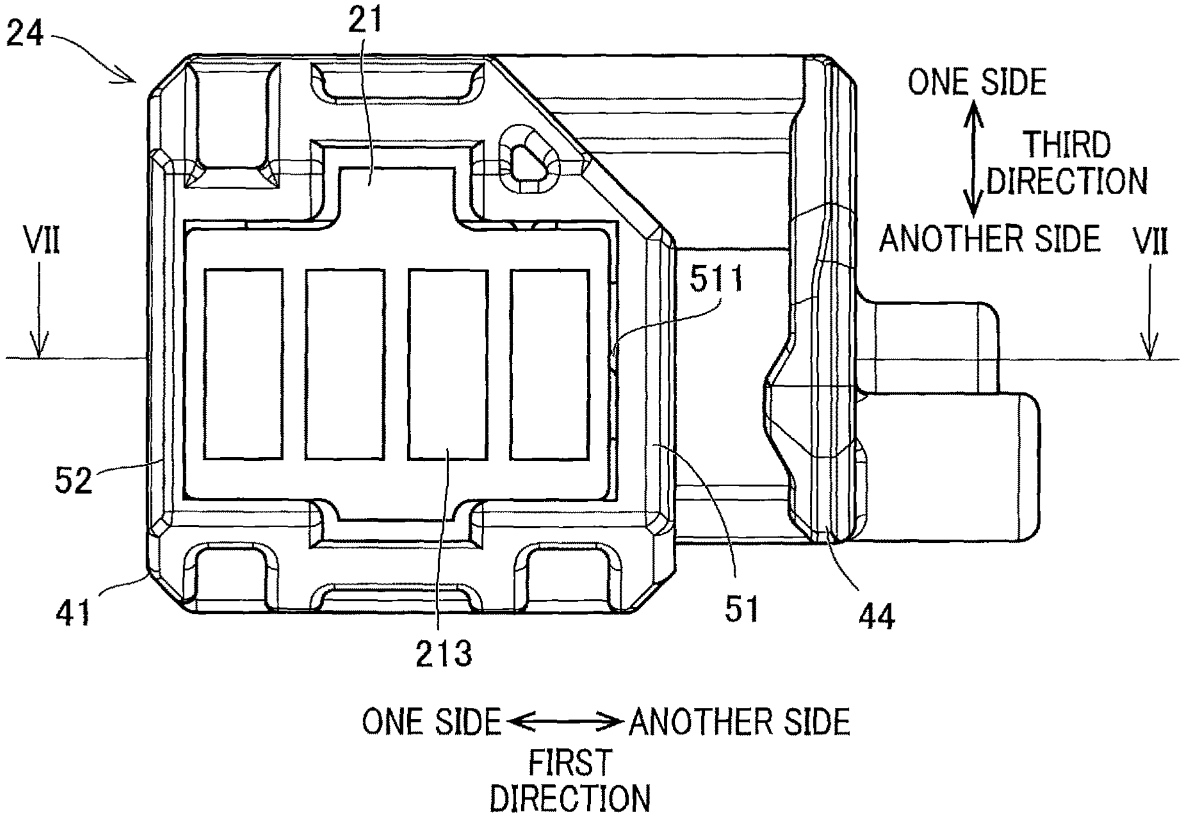
FIG. 5 is a plan view of the IC chip holder.
Figure 6:
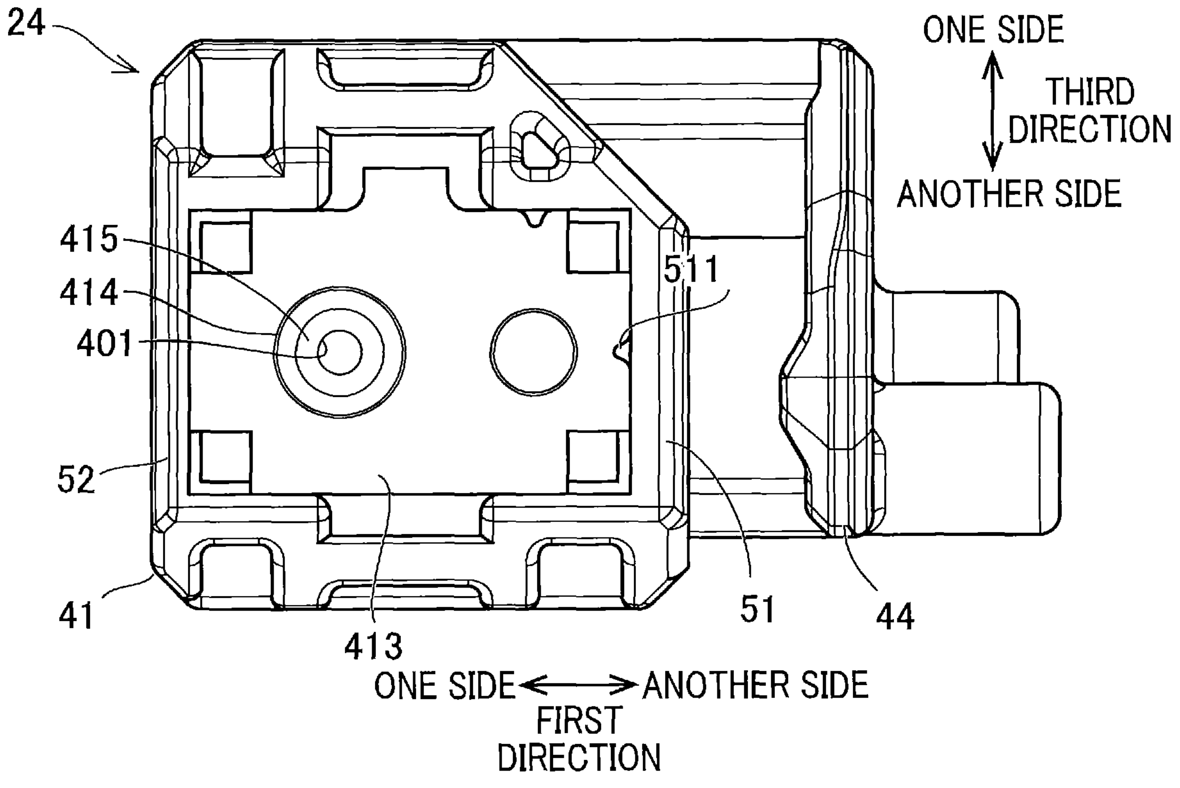
FIG. 6 is a plan view of the IC chip holder with an IC chip detached therefrom.
Figure 7:
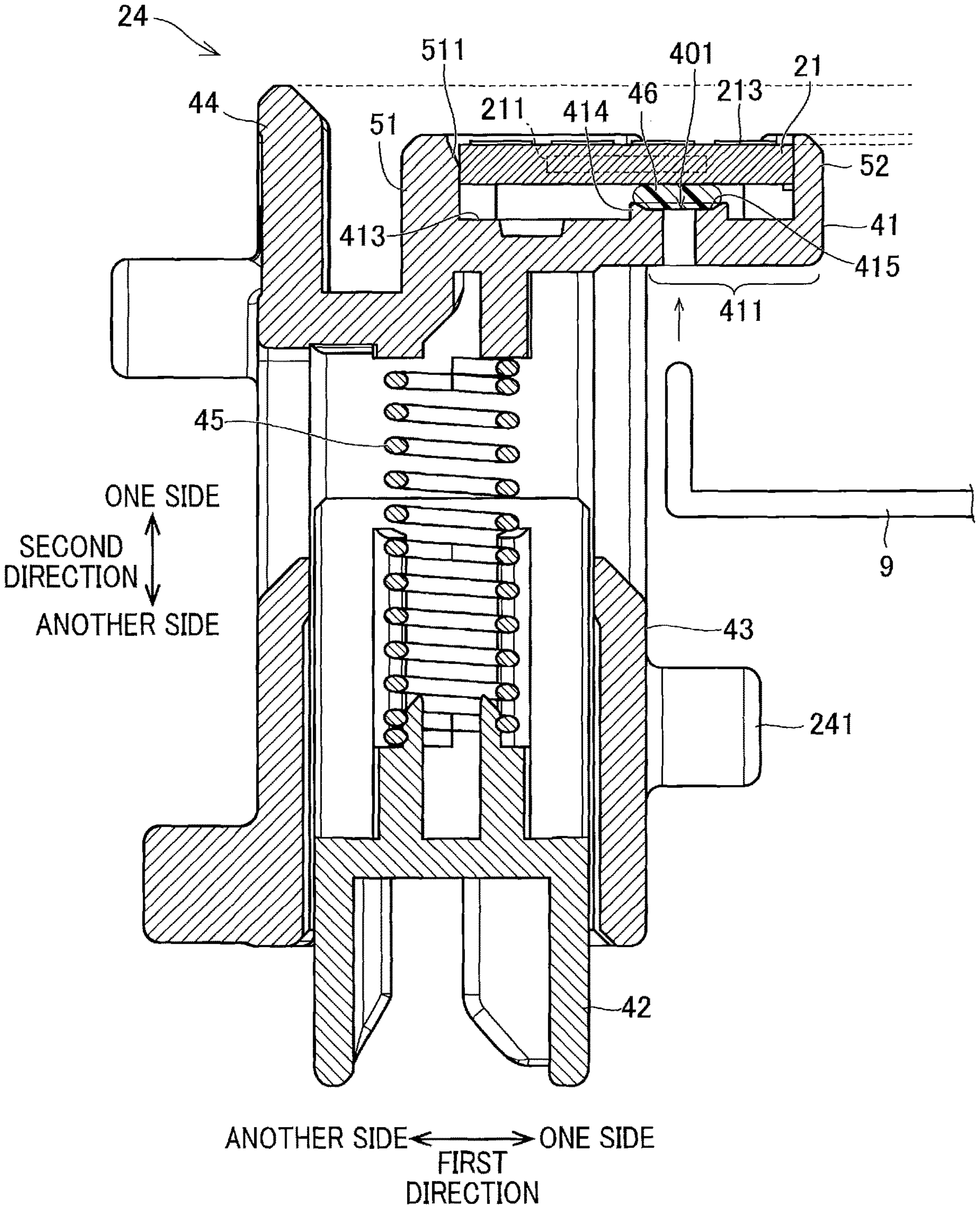
FIG. 7 is a cross-sectional view of the IC chip holder taken along line VII-VII in FIG. 5.

FIG. 1 is a perspective view of a developing cartridge 10 according to an embodiment. FIG. 2 is a side view of the developing cartridge 10 according to the embodiment. FIG. 3 is a perspective view of an IC chip holder 24 as viewed from one side in a second direction. FIG. 4 is a perspective view of the IC chip holder 24 as viewed from another side in the second direction. FIG. 5 is a plan view of the IC chip holder 24. FIG. 6 is a plan view of the IC chip holder 24 with an IC chip 21 detached therefrom. FIG. 7 is a cross-sectional view of the IC chip holder 24 taken along line VII-VII in FIG. 5.

Hereinafter, the direction in which a developing roller axis A12 of a developing roller 12 of the developing cartridge 10 extends will be referred to as "first direction". Further, a direction crossing an electrical contact surface 213 of the developing cartridge 10 will be referred to as "second direction". Further, the direction in which the developing roller 12 and a first agitator 14 are aligned will be referred to as "third direction". The first direction, the second direction, and the third direction cross one another, and preferably are orthogonal to one another.

As illustrated in FIGS. 1 and 2, the developing cartridge 10 includes a housing 11, the developing roller 12, the first agitator 14, a gear cover 18, and a holder assembly 20.

The housing 11 can accommodate therein developing agent. The developing agent is toner, for example. The housing 11 extends in the first direction. The housing 11 has an opening at one end of the housing 11 in the third direction. The housing 11 includes a handle 113. The handle 113 is positioned at another end of the housing 11 in the third direction. The housing 11 has a first outer surface 115 and a second outer surface 116. The first outer surface 115 is positioned at one end of the housing 11 in the second direction. The second outer surface 116 is positioned at another end of the housing 11 in the second direction.

The developing roller 12 is rotatable about the developing roller axis A12 in a state where the developing cartridge 10 is attached to the main body of a printer. The developing roller axis A12 extends in the first direction. The developing roller 12 is positioned at the opening of the housing 11. That is, the developing roller 12 is positioned at the one end of the housing 11 in the third direction. The developing roller 12 is configured to supply the developing agent in the housing 11 to a surface of a photosensitive drum (not illustrated) in a state where the developing cartridge 10 is attached to the main body of the printer.

The developing roller 12 includes a developing roller body 121 and a developing roller shaft 122. The developing roller body 121 has a columnar shape extending in the first direction. The developing roller body 121 is configured of rubber, for example.

The developing roller shaft 122 has a columnar shape extending along the developing roller axis A12. The developing roller shaft 122 is made of metal, for example. The developing roller shaft 122 is positioned inside the developing roller body 121 in the radial direction of the developing roller body 121. The developing roller shaft 122 penetrates the developing roller body 121 in the first direction. The developing roller shaft 122 need not necessarily penetrate the developing roller body 121. The developing roller shaft 122 may be assembled to each end of the developing roller body 121. The developing roller 12 is rotatable about the developing roller shaft 122.

The gear cover 18 is fixed to one end of the housing 11 in the first direction by screws and the like. The gear cover 18 covers various gears used to rotate the developing roller 12 and the first agitator 14.

<Holder Assembly 20>

The holder assembly 20 includes the IC chip 21, the IC chip holder 24, and a holder cover 25. As illustrated in FIGS. 1 and 2, the holder assembly 20 is positioned at one end of the gear cover 18 in the first direction.

As illustrated in FIG. 3, the IC chip 21 includes a developing memory 211 and the electrical contact surface 213. The IC chip 21 is an example of the “storage medium”. The developing memory 211 stores therein information on the developing cartridge 10. For example, the developing memory 211 stores ID information and life information. The ID information is identification information for individually identifying the developing cartridge 10. Specifically, the ID information is a serial number. The life information includes the accumulated number of rotations of the developing roller 12, the accumulated number of sheets printed using the developing roller 12, and the accumulated number of dots, and the like, for example.

The IC chip 21 has a flat-plate shape. The IC chip 21 is positioned at one end of the IC chip holder 24 in the second direction. The electrical contact surface 213 is positioned at one end of the IC chip 21 in the second direction. The electrical contact surface 213 includes four electrodes each having a thin-plate shape. The electrical contact surface 213 is electrically connected to the developing memory 211. The electrical contact surface 213 is parallel to the third direction in a state where the developing cartridge 10 is attached to the main body of the printer. The electrical contact surface 213 is movable relative to the housing 11 in the first direction, in the second direction, and in the third direction.

As illustrated in FIGS. 1 and 2, the IC chip holder 24 is positioned at the one end of the housing 11 in the first direction. As illustrated in FIG. 2, the IC chip holder 24 is positioned between the developing roller 12 and the handle 113 in the third direction.

The IC chip holder 24 holds the IC chip 21. The IC chip holder 24 is an example of the “storage medium holder”. The IC chip holder 24 holds the electrical contact surface 213. The IC chip holder 24 includes a first holder 41, a second holder 42, a third holder 43, a fourth holder 44, and an elastic member 45.

The first holder 41 has an outer surface 413. The outer surface 413 is positioned at one end of the first holder 41 in the second direction. The outer surface 413 has a recessed shape into which the IC chip 21 can be inserted. The IC chip 21 is fixed to the outer surface 413 of the first holder 41. The outer surface 413 of the first holder 41 holds the IC chip 21. The outer surface 413 of the first holder 41 holds the electrical contact surface 213.

The second holder 42 is positioned spaced away from the first holder 41 in the second direction. The second holder 42 is positioned apart from the first holder 41 to the another side in the second direction.

The third holder 43 is coupled to another end of the first holder 41 in the second direction. The third holder 43 extends from the first holder 41 toward the second holder 42 in the second direction. The third holder 43 has a polygonal tubular shape extending in the second direction. One end portion of the second holder 42 in the second direction is inserted in the third holder 43. The second holder 42 is movable relative to the first holder 41 in the second direction. Also, the second holder 42 is movable relative to the third holder 43 in the second direction.

Since the second holder 42 is movable inside the third holder 43, the dimension of the IC chip holder 24 in the second direction can be decreased.

The elastic member 45 is positioned between the first holder 41 and the second holder 42. The elastic member 45 is expandable and shrinkable in the second direction. The elastic member 45 is a coil spring, for example.

As illustrated in FIGS. 1 and 2, the holder cover 25 is positioned at the one end of the gear cover 18 in the first direction. The holder cover 25 surrounds the IC chip holder 24 in cooperation with the gear cover 18. The holder cover 25 surrounds one side of the IC chip holder 24 in the first direction, one side of the IC chip holder 24 in the third direction, and another side of the IC chip holder 24 in the third direction. The holder cover 25 has a U-shape. The holder cover 25 holds the IC chip holder 24. The IC chip holder 24 is movable relative to the holder cover 25 in the first direction, in the second direction, and in the third direction.

As illustrated in FIG. 2, the holder cover 25 includes a plate portion 251. The plate portion 251 is positioned apart from the gear cover 18 to one side in the first direction. The IC chip holder 24 is positioned between the plate portion 251 and the gear cover 18 in the first direction.

As illustrated in FIG. 2, the plate portion 251 has a through hole 254. The through hole 254 is positioned at the plate portion 251 of the holder cover 25. The through hole 254 extends in the third direction. The through hole 254 extends also in the second direction.

The IC chip holder 24 includes a first boss 241 extending in the first direction. The first boss 241 is positioned at one end of the IC chip holder 24 in the first direction. The first boss 241 is inserted in the through hole 254 with spatial room therebetween. As illustrated in FIG. 2, the dimension of the through hole 254 in the second direction is larger than the dimension of the first boss 241 in the second direction.

When the IC chip holder 24 moves in the second direction relative to the holder cover 25, the first boss 241 moves in the second direction inside the through hole 254.

The dimension of the through hole 254 in the third direction is larger than the dimension of the first boss 241 in the third direction. When the IC chip holder 24 moves in the third direction relative to the holder cover 25, the first boss 241 moves in the third direction inside the through hole 254. Since the first boss 241 is movable in the third direction inside the through hole 254, the IC chip holder 24 is movable relative to the housing 11 in the third direction.

The first holder 41 has a first hole 401. The first hole 401 penetrates the first holder 41 in the second direction. The first hole 401 is positioned apart from both the second holder 42 and the elastic member 45 to the one side in the first direction. In other words, in the first direction, the first hole 401 is positioned farther from the housing 11 than the second holder 42 and the elastic member 45 are from the housing 11. The first hole 401 is overlapped with the electrical contact surface 213 of the IC chip 21 in the second direction. In other words, the first hole 401 and the electrical contact surface 213 of the IC chip 21 are overlapped with each other as viewed in the second direction. In the first direction, the first hole 401 is positioned farther from the housing 11 than the third holder 43 is from the housing 11. The first hole 401 is overlapped with the IC chip 21 in the second direction. In other words, the first hole 401 and the IC chip 21 are overlapped with each other as viewed in the second direction.

As illustrated in FIGS. 4 and 7, the first holder 41 includes a protruding portion 411. The protruding portion 411 is a portion protruding further toward the one side in the first direction than the third holder 43. In other words, in the first direction, the protruding portion 411 is positioned farther from the housing 11 than the third holder 43 is from the housing 11. The first hole 401 is positioned at the protruding portion 411.

As illustrated in FIG. 7, a detachment jig 9 is used when detaching the IC chip 21 from the first holder 41. For example, the detachment jig 9 has a rod shape bended 90 degrees. Insertion of the detachment jig 9 into the first hole 401 from the another side in the second direction can push the IC chip 21 attached to the first holder 41 of the IC chip holder 24 toward the one side in the second direction. Hence, the IC chip 21 can be easily detached. Also, since the first hole 401 is positioned farther from the housing 11 in the first direction than the second holder 42 and the elastic member 45 are from the housing 11 in the first direction, the detachment jig 9 can be inserted into the first hole 401 without being hindered by the second holder 42 or the elastic member 45.

Also, the first hole 401 is positioned on the opposite side of the developing memory 211 from the electrical contact surface 213 in the second direction. Hence, the detachment jig 9 inserted into the first hole 401 can be suppressed from coming into contact with the electrical contact surface 213, whereby the electrical contact surface 213 can be protected. Also, by pushing the IC chip 21 using the detachment jig 9, the IC chip 21 can be lifted off the outer surface 413 of the first holder 41. Thus, an operator can detach the IC chip 21 from the first holder 41 by grasping a side surface of the IC chip 21 lifted off the outer surface 413. That is, the operator can be suppressed from touching the electrical contact surface 213 and the developing memory 211 which are formed in the IC chip 21.

The elastic member 45 is positioned inside the third holder 43. One end of the elastic member 45 in the second direction is in contact with the first holder 41. Another end of the elastic member 45 in the second direction is in contact with the second holder 42.

As illustrated in FIG. 7, the IC chip holder 24 includes an adhesive 46. The adhesive 46 is positioned between the electrical contact surface 213 of the IC chip 21 and the first holder 41. The adhesive 46 is positioned between the IC chip 21 and the outer surface 413 of the first holder 41 in the second direction. The adhesive 46 may be a double-sided tape (a sheet-like base material with both sides applied with adhesive).

As illustrated in FIG. 7, the adhesive 46 is overlapped with the electrical contact surface 213 of the IC chip 21 in the second direction. In other words, the adhesive 46 and the electrical contact surface 213 are overlapped with each other as viewed in the second direction. Also, as illustrated in FIG. 7, the adhesive 46 is overlapped with the first hole 401 in the second direction. In other words, the adhesive 46 and the first hole 401 are overlapped with each other as viewed in the second direction.

Since the adhesive 46 is positioned between the electrical contact surface 213 of the IC chip 21 and the first holder 41, the IC chip 21 and the electrical contact surface 213 can be fixed to the first holder 41.

Since the adhesive 46 is overlapped with the first hole 401 in the second direction, the IC chip 21 can be pushed through the adhesive 46 by the detachment jig 9 when the detachment jig 9 is inserted into the first hole 401. Hence, direct contact of the IC chip 21 with the detachment jig 9 can be suppressed, whereby the IC chip 21 can be properly protected.

As illustrated in FIG. 7, the first holder 41 includes a holder protruding portion 414 protruding in the second direction. The holder protruding portion 414 is positioned at the outer surface 413 of the first holder 41. The holder protruding portion 414 protrudes toward the one side in the second direction. In other words, the holder protruding portion 414 protrudes in a direction away from the second holder 42. As illustrated in FIG. 6, the first hole 401 is positioned inward of the holder protruding portion 414. The adhesive 46 is positioned on the holder protruding portion 414.

The first holder 41 includes a holder recessed portion 415 (the second holder recessed portion) recessed in the second direction from the one side toward the another side (in a direction approaching the second holder 42). The holder recessed portion 415 is recessed from the holder protruding portion 414 toward the other side in the second direction (in a direction approaching the second holder 42). The first hole 401 is positioned in the holder recessed portion 415. The adhesive 46 is positioned in the holder recessed portion 415.

Since the adhesive 46 is positioned in the holder recessed portion 415, the adhesive 46 is positioned between the electrical contact surface 213 and the holder protruding portion 414. Thus, the detachment jig 9 can be suppressed from coming into direct contact with the IC chip 21 when the detachment jig 9 is inserted into the first hole 401.

Also, the adhesive 46 need not necessarily be positioned in only the holder recessed portion 415, but the adhesive 46 may be positioned outside the holder recessed portion 415. For example, the adhesive 46 may be positioned over the entire outer surface 413.

The fourth holder 44 is positioned between the housing 11 and the electrical contact surface 213 in the first direction. The fourth holder 44 is connected to another end of the first holder 41 in the first direction (i.e., an end of the first holder 41 at another side in the first direction). The fourth holder 44 is positioned between the housing 11 and the first holder 41 in the first direction. One end of the fourth holder 44 in the second direction is positioned further toward the one side in the second direction than the electrical contact surface 213. In other words, in the second direction, a portion of the fourth holder 44 is positioned farther from the second holder 42 than the electrical contact surface 213 is from the second holder 42.

In the second direction, a portion of the fourth holder 44 is farther from the second holder 42 than the electrical contact surface 213 is from the second holder 42. Thus, in a state where the portion of the fourth holder 44 is made in contact with a fixed surface such as a surface of a table, the detachment jig 9 is inserted into the first hole 401 from the another side in the second direction. Hence, the IC chip 21 can be lifted off the first holder 41.

The one end of the first holder 41 in the second direction is positioned further toward the one side in the second direction than the electrical contact surface 213. In other words, in the second direction, a portion of the first holder 41 is positioned farther from the second holder 42 than the electrical contact surface 213 is from the second holder 42.

The first holder 41 includes a first side portion 51 and a second side portion 52. The first side portion 51 and the second side portion 52 extend in the third direction. The second side portion 52 is positioned apart from the first side portion 51 in the first direction. Specifically, the second side portion 52 is positioned apart from the first side portion 51 to the one side in the first direction. The first side portion 51 includes a press-fitting protrusion 511 protruding toward the second side portion 52 in the first direction. The IC chip 21 is press-fitted between the press-fitting protrusion 511 and the second side portion 52 in the first direction. That is, the electrical contact surface 213 is press-fitted between the press-fitting protrusion 511 and the second side portion 52 in the first direction.

The electrical contact surface 213 is press-fitted between the press-fitting protrusion 511 and the second side portion 52, so that the electrical contact surface 213 is attached to the first holder 41.

As illustrated in FIG. 6, the first hole 401 is overlapped with the press-fitting protrusion 511 in the first direction. Specifically, as illustrated in FIG. 6, the first hole 401 and the press-fitting protrusion 511 are aligned in the first direction as viewed in the second direction. In other words, at least a portion of the first hole 401 and at least a portion of the press-fitting protrusion 511 are positioned at the same position in the third direction. Since the first hole 401 is overlapped with the press-fitting protrusion 511 (i.e., since the first hole 401 and the press-fitting protrusion 511 are aligned in the first direction as viewed in the second direction), a portion of the IC chip 21 that receives a force from the press-fitting protrusion 511 is pushed by the detachment jig 9 when the detachment jig 9 is inserted into the first hole 401. Hence, the IC chip 21 can be easily detached.

As illustrated in FIGS. 6 and 7, in a state where the electrical contact surface 213 is held by the first holder 41, the first hole 401 is positioned closer to the second side portion 52 in the first direction than the press-fitting protrusion 511 is to the second side portion 52 in the first direction.

The first hole 401 is positioned closer to the second side portion 52 than the press-fitting protrusion 511 is to the second side portion 52. Thus, a portion of the IC chip 21 that is far away from the press-fitting protrusion 511 is pushed by the detachment jig 9 when the detachment jig 9 is inserted into the first hole 401. Hence, the IC chip 21 is easily detached using the principle of leverage.

2. Second Embodiment

Next, a second embodiment will be described. In the following description, components having the same functions as those of the already-described components will be designated with the same reference numbers or with the same reference numbers having an alphabetic character appended, and detailed descriptions thereof may be omitted.

Figure 8:
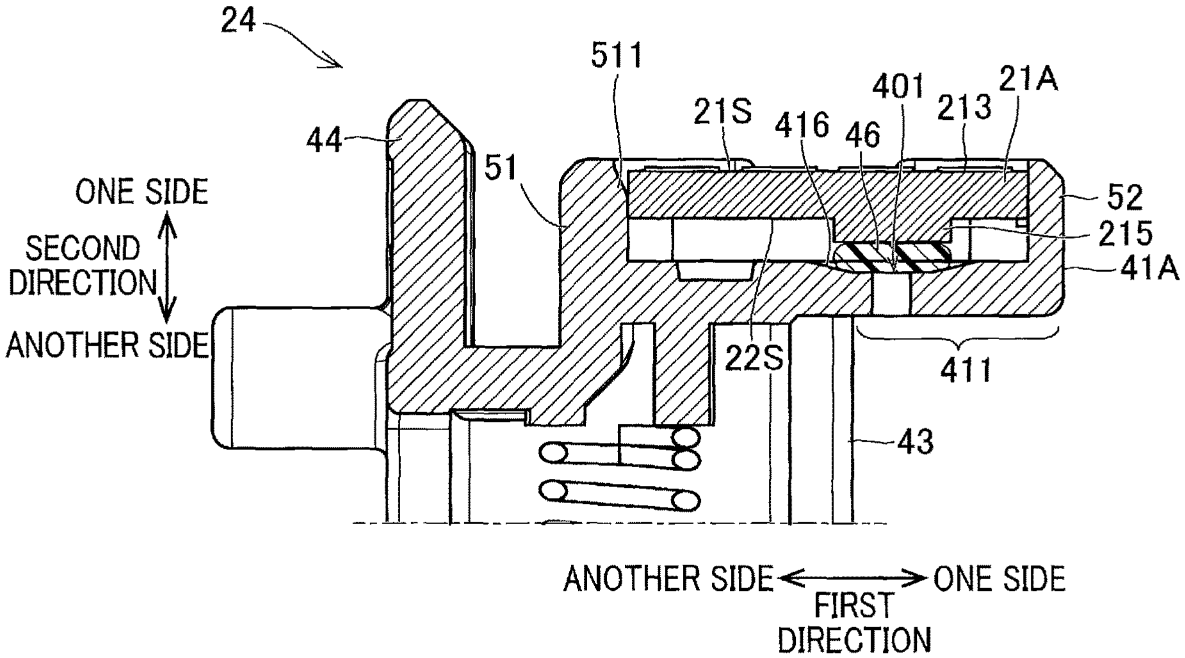
FIG. 8 is a partial cross-sectional view of an IC chip holder.

FIG. 8 is a partial cross-sectional view of the IC chip holder 24 according to the second embodiment. The IC chip holder 24 according to the second embodiment includes a first holder 41A in place of the first holder 41. The first holder 41A has the same structure as the first holder 41. However, the first holder 41A has a holder recessed portion 416 (the first holder recessed portion) recessed in the second direction from the one side toward the another side (in a direction approaching the second holder 42). The holder recessed portion 416 is positioned at the outer surface 413 of the first holder 41A. The first hole 401 is positioned in the holder recessed portion 416. The adhesive 46 is positioned in the holder recessed portion 416.

Since the adhesive 46 is positioned in the holder recessed portion 416, the adhesive 46 is positioned between the first holder 41A and the electrical contact surface 213. Hence, the detachment jig 9 can be suppressed from coming into direct contact with an IC chip 21A when the detachment jig 9 is inserted into the first hole 401.

The first holder 41A of the IC chip holder 24 holds the IC chip 21A. The IC chip 21A has a first surface 21S, a second surface 22S, and an IC chip protruding portion 215. The electrical contact surface 213 is positioned at the first surface 21S. The second surface 22S is positioned opposite the first surface 21S in the second direction. The IC chip protruding portion 215 protrudes from the second surface 22S toward the another side in the second direction. In other words, the IC chip protruding portion 215 protrudes in a direction away from the first surface 21S. The IC chip protruding portion 215 is a developing memory, for example. The first hole 401 is overlapped with the IC chip protruding portion 215 in the second direction. In other words, the first hole 401 and the IC chip protruding portion 215 are overlapped with each other as viewed in the second direction.

The holder recessed portion 416 is overlapped with the IC chip protruding portion 215 in the second direction. In other words, the holder recessed portion 416 and the IC chip protruding portion 215 are overlapped with each other as viewed in the second direction. Thus, the adhesive 46 is overlapped with the IC chip protruding portion 215 in the second direction. In other words, the adhesive 46 and the IC chip protruding portion 215 are overlapped with each other as viewed in the second direction. Hence, the detachment jig 9 can be suppressed from coming into direct contact with the IC chip protruding portion 215 when the detachment jig 9 is inserted into the first hole 401. Accordingly, the IC chip protruding portion 215 can be properly protected.

3. Third Embodiment

Figure 9:
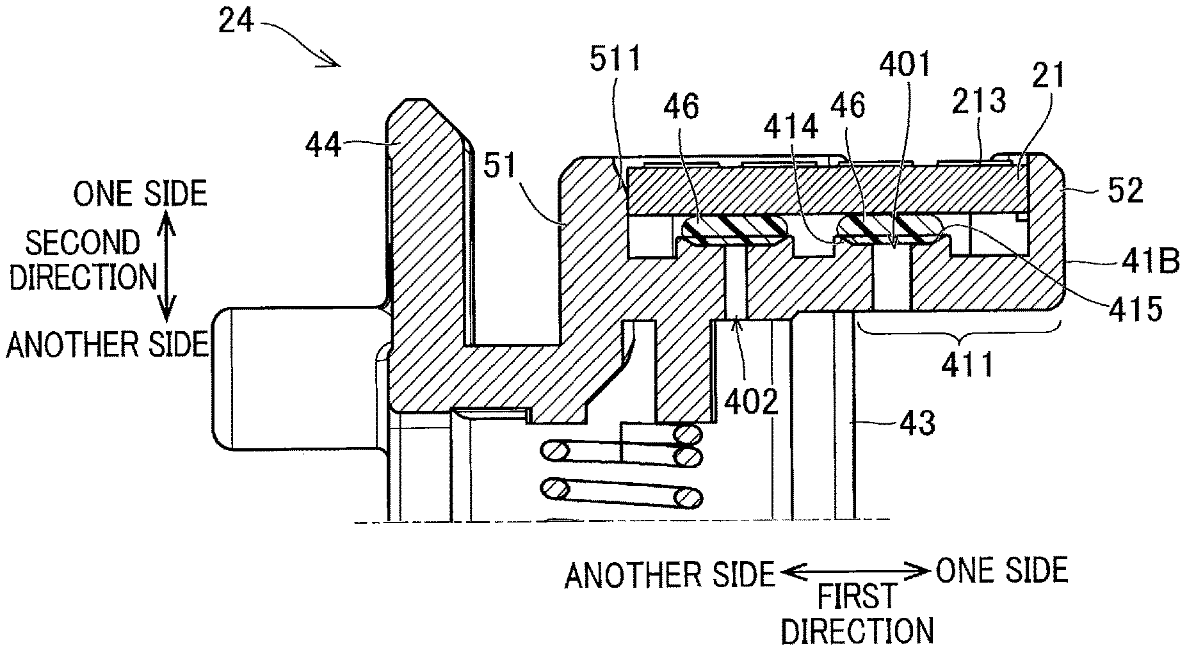
FIG. 9 is a partial cross-sectional view of an IC chip holder.

FIG. 9 is a partial cross-sectional view of the IC chip holder 24 according to a third embodiment. The IC chip holder 24 according to the third embodiment includes a first holder 41B in place of the first holder 41. The first holder 41B has the same structure as the first holder 41. However, the first holder 41B has a second hole 402. The second hole 402 penetrates the first holder 41B in the second direction. The second hole 402 is positioned between the housing 11 and the first hole 401 in the first direction. The second hole 402 is positioned in the third holder 43. The adhesive 46 is overlapped with the second hole 402 in the second direction. In other words, the adhesive 46 and the second hole 402 are overlapped with each other as viewed in the second direction.

Since the adhesive 46 is overlapped with the second hole 402, the adhesive 46 can be checked through the second hole 402. This can suppress forgetting to apply the adhesive 46. Also, the adhesive 46 is positioned in the third holder 43. Hence, the adhesive 46 can be checked through the second hole 402 by peeking through the inside of the third holder 43 from the another side in the second direction.

The inner dimension (the inner diameter) of the first hole 401 is larger than the inner dimension (the inner diameter) of the second hole 402. Hence, the detachment jig 9 is easily inserted into the first hole 401.

Figure 10:
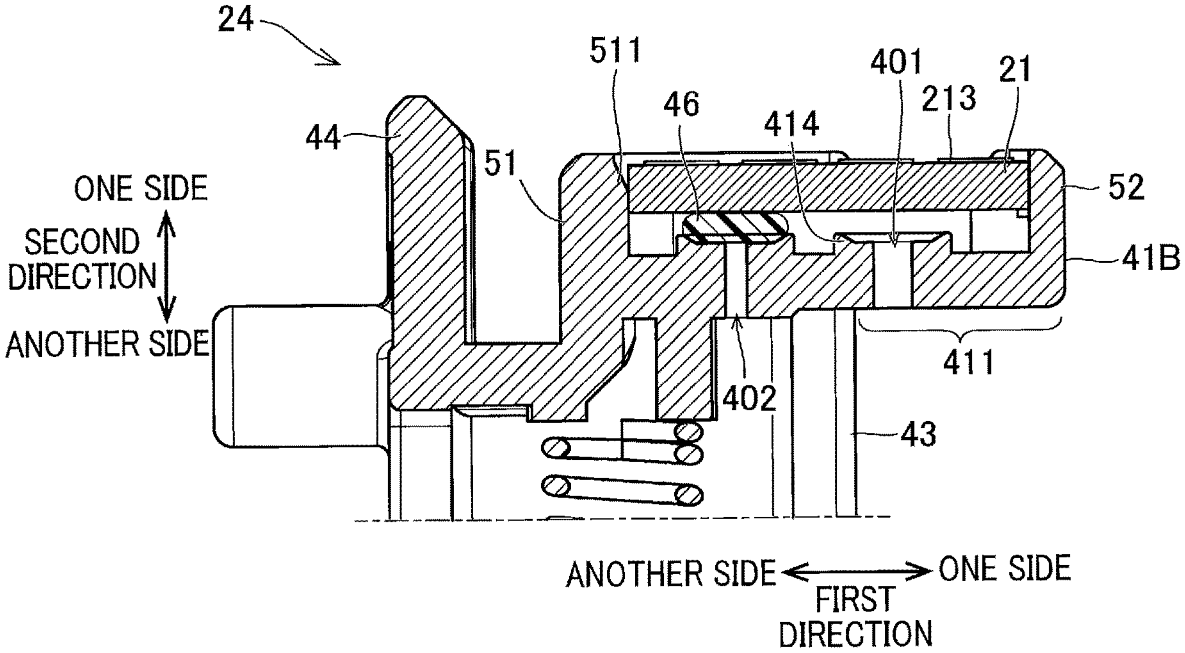
FIG. 10 is a partial cross-sectional view of an IC chip holder.

FIG. 10 is a partial cross-sectional view of the IC chip holder 24 according to a modification of the third embodiment. As illustrated in FIG. 10, the adhesive 46 need not necessarily be overlapped with the first hole 401 and may be overlapped with only the second hole 402. That is, the first hole 401 may be positioned apart from the adhesive 46 in the first direction.

In a case where the first hole 401 is positioned apart from the adhesive 46, the IC chip 21 can be easily detached from the first holder 41B using the principle of leverage when the detachment jig 9 is inserted into the first hole 401.

Fourth Embodiment

Figure 11:
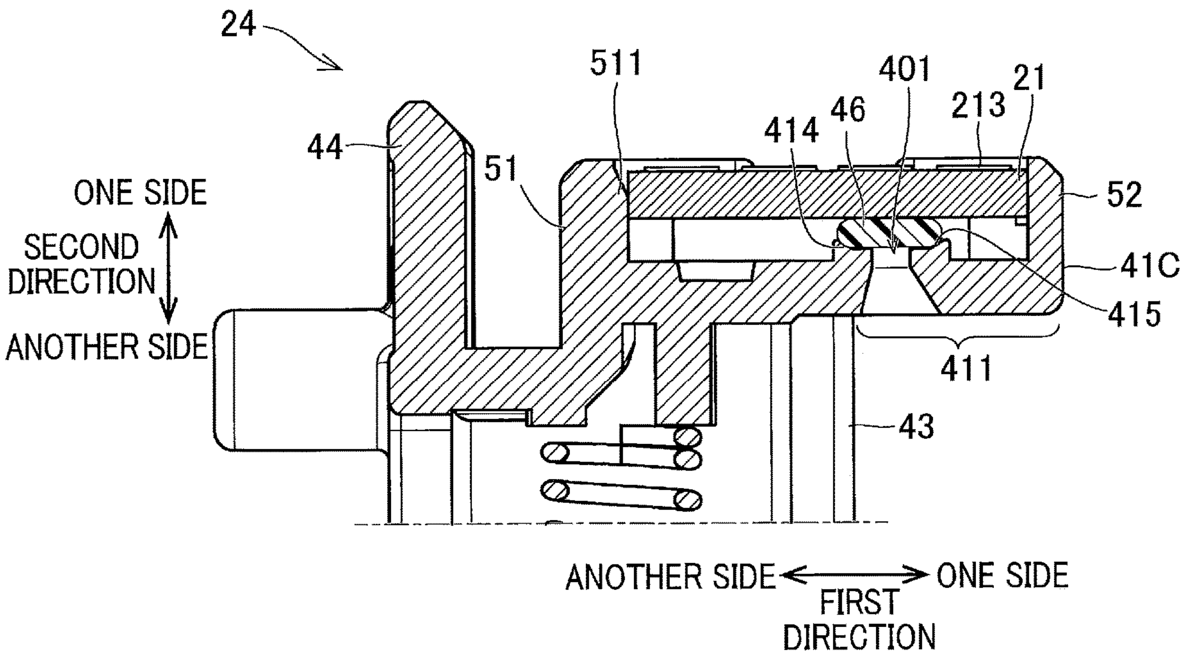
FIG. 11 is a partial cross-sectional view of an IC chip holder.

FIG. 11 is a partial cross-sectional view of the IC chip holder 24 according to a fourth embodiment. The IC chip holder 24 according to the fourth embodiment includes a first holder 41C in place of the first holder 41. The first holder 41C has the same structure as the first holder 41. However, the inner dimension (the inner diameter) of the first hole 401 of the first holder 41C increases toward the another side in the second direction. In other words, the inner dimension (the inner diameter) of the first hole 401 of the first holder 41C increases as approaching the second holder 42 in the second direction. A cross section of the first hole 401 when the first holder 41C is cut along a plane parallel to the second direction is a trapezoid shape. In other words, in the fourth embodiment, a cross section of the first hole 401 taken along a plane parallel to the second direction is a trapezoid.

Since the inner dimension of the first hole 401 of the first holder 41C increases as approaching the second holder 42, the detachment jig 9 can be guided into the first hole 401.

5. Fifth Embodiment

Figure 12:
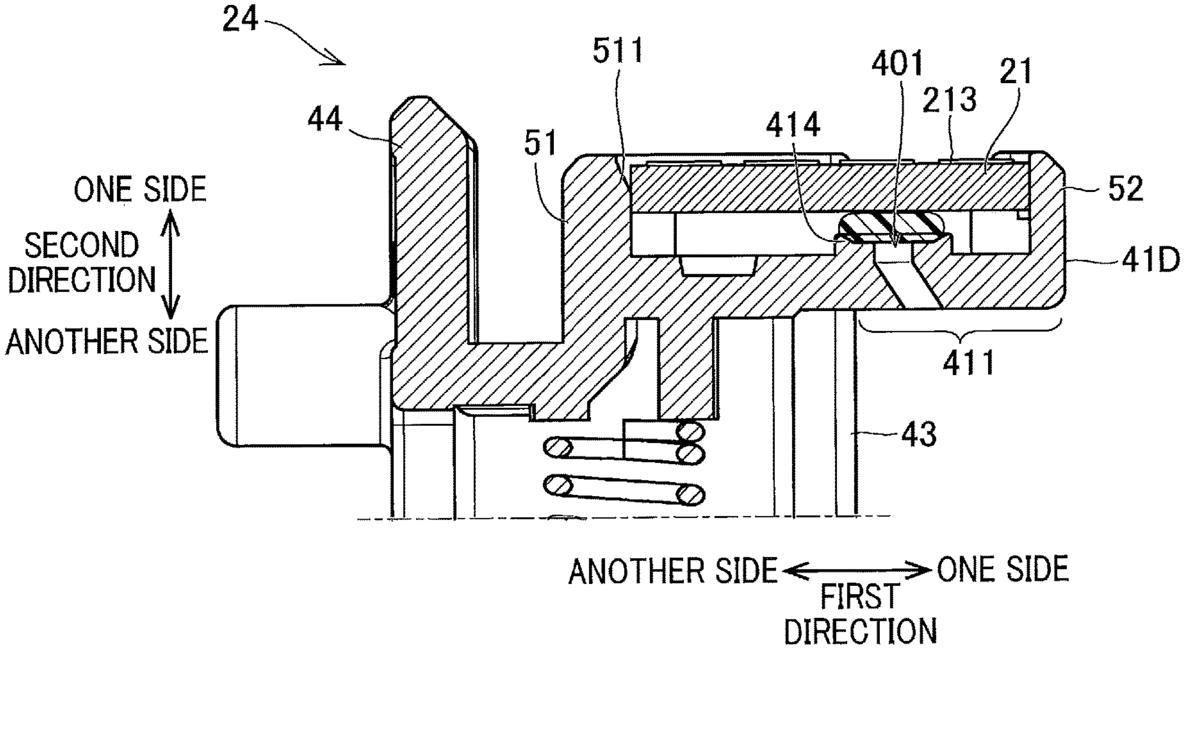
FIG. 12 is a partial cross-sectional view of an IC chip holder.

FIG. 12 is a partial cross-sectional view of the IC chip holder 24 according to a fifth embodiment. The IC chip holder 24 according to the fifth embodiment includes a first holder 41D in place of the first holder 41. The first holder 41D has the same structure as the first holder 41. However, a cross section of the first hole 401 when the first holder 41D is cut along a plane parallel to the second direction is a parallelogram shape. In other words, in the fifth embodiment, a cross section of the first hole 401 taken along a plane parallel to the second direction is a parallelogram. More specifically, the first hole 401 extends toward the one side in the first direction as extending toward the another side in the second direction.

Since the cross section of the first hole 401 is a parallelogram, the detachment jig 9 can be easily inserted into the first hole 401.

6. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

In the above embodiment, there has been described a case in which the developing cartridge 10 is employed as the cartridge. However, the cartridge may be a drum cartridge including a photosensitive drum and attachable to the main body of the printer.

While the present disclosure has been described in detail, the above descriptions are illustrative in all aspects and the present disclosure is not limited thereto. It is understood that countless modifications that have not been exemplified can be conceivable without departing from the scope of this disclosure. The components described in the above embodiments and modifications may be combined or omitted as long as no contradictions occur.

What is claimed is:

1. A cartridge comprising:
 a housing;
 a storage medium including an electrical contact surface; and
 a storage medium holder holding the storage medium, the storage medium holder being positioned at one end portion of the housing in a first direction, the storage medium holder being movable relative to the housing,
 wherein the storage medium holder comprises:
  a first holder holding the electrical contact surface;
  a second holder positioned spaced away from the first holder in a second direction crossing the first direction; and
  an elastic member positioned between the first holder and the second holder, the elastic member being expandable and shrinkable in the second direction,
 wherein the first holder has a first hole, the first hole being a through hole penetrating the first holder in the second direction,
 wherein the entire second holder and the entire elastic member are positioned between the first hole and the housing in the first direction, and
 wherein the first hole is overlapped with the electrical contact surface as viewed in the second direction.

2. The cartridge according to claim 1,
 wherein the storage medium holder further comprises:
  a third holder extending from the first holder toward the second holder in the second direction, and
 wherein the first hole is positioned farther from the housing in the first direction than the third holder is from the housing in the first direction.

3. The cartridge according to claim 2,
wherein the first hole is overlapped with the storage medium as viewed in the second direction.

4. The cartridge according to claim 2,
wherein the third holder has a tubular shape extending in the second direction, and
wherein the elastic member is positioned in the third holder.

5. The cartridge according to claim 4,
wherein a portion of the second holder is positioned in the third holder, and
wherein the second holder is movable relative to the third holder in the second direction.

6. The cartridge according to claim 1, further comprising:
an adhesive positioned between the electrical contact surface and the first holder.

7. The cartridge according to claim 6,
wherein the adhesive is overlapped with the electrical contact surface as viewed in the second direction.

8. The cartridge according to claim 7,
wherein the storage medium has:
a first surface at which the electrical contact surface is positioned; and
a second surface positioned opposite the first surface in the second direction,
wherein the storage medium comprises:
a storage medium protruding portion protruding from the second surface in the second direction, the storage medium protruding portion protruding in a direction away from the first surface, and
wherein the first hole is overlapped with the storage medium protruding portion as viewed in the second direction.

9. The cartridge according to claim 7,
wherein the first holder comprises:
a first holder recessed portion recessed in the second direction,
wherein the first hole is positioned in the first holder recessed portion, and
wherein the adhesive is positioned in the first holder recessed portion.

10. The cartridge according to claim 7,
wherein the first holder comprises:
a holder protruding portion protruding in the second direction, the holder protruding portion protruding in a direction away from the second holder in the second direction,
wherein the first hole is surrounded by the holder protruding portion, and
wherein the adhesive is positioned on the holder protruding portion.

11. The cartridge according to claim 10,
wherein the first holder comprises:
a second holder recessed portion recessed from the holder protruding portion in the second direction, the second holder recessed portion being recessed toward the second holder in the second direction,
wherein the first hole is positioned in the second holder recessed portion, and
wherein the adhesive is positioned in the second holder recessed portion.

12. The cartridge according to claim 6,
wherein the adhesive is overlapped with the first hole as viewed in the second direction.

13. The cartridge according to claim 6,
wherein the first hole is positioned apart from the adhesive in the first direction.

14. The cartridge according to claim 6,
wherein the first holder further has a second hole penetrating the first holder in the second direction, and
wherein the adhesive is overlapped with the second hole as viewed in the second direction.

15. The cartridge according to claim 14,
wherein an inner dimension of the first hole is larger than an inner dimension of the second hole.

16. The cartridge according to claim 1,
wherein an inner dimension of the first hole increases toward the second holder in the second direction.

17. The cartridge according to claim 1,
wherein the first hole has a parallelogram shape.

18. The cartridge according to claim 1,
wherein a portion of the first holder is positioned farther from the second holder in the second direction than the electrical contact surface is from the second holder in the second direction.

19. The cartridge according to claim 1,
wherein the storage medium holder further comprises:
a fourth holder positioned between the housing and the electrical contact surface in the first direction, and
wherein a portion of the fourth holder is positioned farther from the second holder in the second direction than the electrical contact surface is from the second holder in the second direction.

20. The cartridge according to claim 1,
wherein the first holder comprises:
a first side portion extending in a third direction crossing both the first direction and the second direction; and
a second side portion extending in the third direction, the second side portion being positioned apart from the first side portion in the first direction,
wherein the first side portion includes a press-fitting protruding portion protruding toward the second side portion in the first direction, and
wherein the electrical contact surface is press-fitted between the press-fitting protruding portion and the second side portion.

21. The cartridge according to claim 20,
wherein the first hole and the press-fitting protruding portion are aligned in the first direction as viewed in the second direction.

22. The cartridge according to claim 20,
wherein, in a state where the electrical contact surface is held by the first holder, the first hole is positioned closer to the second side portion in the first direction than the press-fitting protruding portion is to the second side portion in the first direction.

23. The cartridge according to claim 1, further comprising:
a developing roller rotatable about a developing roller axis extending in the first direction,
wherein the housing is configured to accommodate therein developing agent.

24. The cartridge according to claim 1, wherein the storage medium holder includes a recessed outer surface that holds the storage medium in a state where the storage medium is inserted in the recessed outer surface.

25. The cartridge according to claim 24, wherein the first holder has the recessed outer surface and holds the electrical contact surface of the storage medium in the state where the storage medium is inserted in the recessed outer surface.

* * * * *